(12) United States Patent
Kukanov et al.

(10) Patent No.: US 8,127,303 B2
(45) Date of Patent: Feb. 28, 2012

(54) FAIR SCALABLE READER-WRITER MUTUAL EXCLUSION

(75) Inventors: Alexey Kukanov, Nizhny Novgorod (RU); Arch Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 12/782,394

(22) Filed: May 18, 2010

(65) Prior Publication Data

US 2010/0293553 A1 Nov. 18, 2010

Related U.S. Application Data

(63) Continuation of application No. 11/215,863, filed on Aug. 30, 2005, now Pat. No. 7,730,491.

(51) Int. Cl.
G06F 9/46 (2006.01)
G06F 7/00 (2006.01)

(52) U.S. Cl. ......... 718/108; 718/106; 718/107; 707/800

(58) Field of Classification Search ........................ None
See application file for complete search history.

(56) References Cited

U.S. PATENT DOCUMENTS

| | | | |
|---|---|---|---|
| 6,081,665 A | 6/2000 | Nilsen et al. | |
| 6,112,222 A | 8/2000 | Govindaraju et al. | |
| 6,341,302 B1 | 1/2002 | Celis | |
| 6,480,918 B1 | 11/2002 | McKenney et al. | |
| 6,546,443 B1 | 4/2003 | Kakivaya et al. | |
| 6,684,398 B2 | 1/2004 | Chaudhry et al. | |
| 6,823,511 B1 * | 11/2004 | McKenney et al. | 718/102 |
| 6,934,950 B1 | 8/2005 | Tuel et al. | |
| 6,965,961 B1 | 11/2005 | Scott | |
| 7,234,139 B1 | 6/2007 | Feinberg | |

(Continued)

FOREIGN PATENT DOCUMENTS

EP 0943993 A2 9/1999

(Continued)

OTHER PUBLICATIONS

Mellor-Crummey et al., "Scalable reader-writer synchronization for shared memory multi-processors", ACM SIGPLAN Notices, ACM, Association for Computing Machinery, New York, US, vol. 26, No. 7, XP002402085, ISSN: 0362-1340, Jul. 1991, pp. 106-113.

(Continued)

*Primary Examiner* — Emerson Puente
*Assistant Examiner* — Adam Lee
(74) *Attorney, Agent, or Firm* — D'Ann Naylor Rifai

(57) ABSTRACT

Implementing fair scalable reader writer mutual exclusion for access to a critical section by a plurality of processing threads in a processing system is accomplished by creating a first queue node for a first thread on the first thread's stack, the queue node representing a request by the first thread to access the critical section; adding the first queue node to a queue pointed to by a single word reader writer mutex for the critical section, the queue representing a list of threads desiring access to the critical section, each queue node in the queue being on a stack of a thread of the plurality of processing threads; waiting until the first queue node has no preceding write requests as indicated by predecessor queue nodes on the queue; entering the critical section by the first thread; exiting the critical section by the first thread; and removing the first queue node from the queue.

21 Claims, 5 Drawing Sheets

U.S. PATENT DOCUMENTS

| | | | |
|---|---|---|---|
| 7,430,627 B2 | 9/2008 | McKenney | |
| 7,493,618 B2 | 2/2009 | Michael et al. | |
| 7,730,491 B2* | 6/2010 | Kukanov et al. | 718/108 |
| 7,844,973 B1* | 11/2010 | Dice | 718/108 |
| 2002/0032719 A1 | 3/2002 | Thomas et al. | |
| 2003/0023656 A1 | 1/2003 | Hutchison et al. | |
| 2003/0200457 A1* | 10/2003 | Auslander et al. | 713/200 |
| 2005/0060443 A1* | 3/2005 | Rosner | 710/33 |
| 2005/0138639 A1* | 6/2005 | Hagan | 719/318 |
| 2005/0149634 A1* | 7/2005 | McKenney | 709/248 |
| 2005/0201347 A1* | 9/2005 | Abhishek et al. | 370/338 |
| 2006/0048149 A1 | 3/2006 | Clift | |
| 2006/0143511 A1* | 6/2006 | Huemiller, Jr. | 714/12 |
| 2006/0225078 A1 | 10/2006 | Anderson | |
| 2007/0044103 A1 | 2/2007 | Rosenbluth et al. | |
| 2007/0157200 A1 | 7/2007 | Hopkins | |

FOREIGN PATENT DOCUMENTS

| | | |
|---|---|---|
| WO | 2007/027365 A1 | 3/2007 |

OTHER PUBLICATIONS

Hendler et al., "A Scalable Lock-Free Stack Algorithm", Proceedings of the Sixteenth Annual ACM Symposium on Parallelism in Algorithms and Architectures, Barcelona, Spain, XP002408296, Jun. 27, 2004, pp. 206-215.

Krieger et al., "A Fair Fast Scalable Reader-Writer Lock", Proceedings of the International Conference on Parallel Processing, XP002402082, Aug. 1993, pp. 201-204.

Mellor-Crummey et al., "Algorithms for Scalable Synchronization on Shared-Memory Multiprocessors", ACM Transactions on Computer Systems, ACM, New York, US, vol. 9, No. 1, XP000240573, ISSN: 0734-2071, Feb. 1, 1991, pp. 21-65.

Anonymous, "Spin Queues Nov. 1975 IBM Technical Disclosure Bulletin", W.W. Collier and K.L. Howell, vol. 18, No. 6, New York, US, XP002408297, Nov. 1, 1975, pp. 1953-1954.

Harris, "A Pragmatic Implementation of Non-Blocking Linked-Lists", Proceedings of the 15th International Conference on Distributed Computing, vol. 2180, Oct. 2001, pp. 300-314.

International Search Report and Written Opinion received for PCT Application No. PCT/US2006/030521, mailed on Dec. 12, 2006, 13 pages.

International Preliminary Report on Patentability received for PCT Application No. PCT/US2006/030521, mailed on Mar. 13, 2008, 8 pages.

* cited by examiner

FAIR SCALABLE READER-WRITER MUTUAL EXCLUSION

CROSS REFERENCE TO RELATED APPLICATIONS

The present application is a continuation of now pending U.S. patent application Ser. No. 11/215,863, entitled "Fair Scalable Reader-Writer Mutual Exclusion" filed on Aug. 30, 2005.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to multithreaded programming and, more specifically, to mutual exclusion of readers and writers in a multithreaded programming environment.

2. Description

Mutual exclusion is a programming technique that ensures that only one program or routine at a time can access some resource, such as a memory location, an input/output (I/O) port, or a file, often through the use of semaphores, which are flags used in programs to coordinate the activities of more than one program or routine. An object for implementing mutual exclusion (or mutex) may be called a lock.

A reader-writer (RW) lock allows either multiple readers to inspect shared data or a single writer exclusive access for modifying that data. On shared memory multiprocessors, the cost of acquiring and releasing these locks can have a large impact on the performance of parallel applications. A major problem with naïve implementations of these locks, where processors spin on a global lock variable waiting for the lock to become available, is that the memory containing the lock and the interconnection network to that memory will become contended when the lock is contended.

Various approaches in the prior art implement scalable exclusive locks, that is, exclusive locks that can become contended without resulting in memory or interconnection contention. These approaches depend either on cache hardware support or on the existence of local memory, where accesses to local memory involve lower latency than accesses to remote memory.

In "Scalable Reader-Writer Synchronization for Shared-Memory Multiprocessors", by John M. Mellor-Crummey and Michael L. Scott, Proceedings of the 3$^{rd}$ ACM Symposium on Principles and Practice of Parallel Programming, pp. 106-113, Williamsburg, Va., April 1991, the authors describe an exclusive lock which uses atomic operations to build a singly linked list of waiting processors. The processor at the head of the list has the lock and new processors add themselves to the list tail. Rather than spinning on a global lock variable, each processor spins on a variable in its local memory. A processor releases the lock by zeroing the variable on which the next processor in the queue in spinning.

For the RW variant of this exclusive lock, each queue element contains an additional variable to maintain the state of the request. When a new reader request arrives, the state of the previous element in the queue is examined to determine if the new request must block. With a RW lock, readers must be able to release the lock in any order. Hence, the singly linked list of Mellor-Crummey and Scott becomes discontinuous as readers dequeue. To allow for this, two global variables were added to their exclusive lock, a count of the number of active readers and a pointer to the first writer in the queue. As readers acquire and release the lock, they keep the global count of active readers up to date. When releasing the lock, if a reader discovers that the reader count is zero, it unblocks the writer pointed to by the global variable.

In "A Fair Fast Scalable Reader-Writer Lock" by Orran Krieger, Michael Stumm, Ron Unrau, and Jonathan Hanna, Proceedings of the 1993 International Conference on Parallel Processing, the authors describe a fair scalable RW locking algorithm derived from Mellor-Crummey and Scott's exclusive locking algorithm. In the Krieger et al., process, rather than adding more global state (that can become contended), an extra state needed for a RW lock is distributed across the list associated with the lock. In particular, readers are maintained in a doubly linked list. With a doubly linked list, instead of synchronizing on a global variable, a reader that is releasing the lock can synchronize with its nearest neighbors to remove itself from the queue. This allows readers to dequeue in any order without the list becoming discontinuous. Hence, it is not necessary to keep either a global pointer to the first writer or a global count of the number of active readers.

There are at least several disadvantages with the two prior art approaches discussed above. In each of the above approaches, queue nodes cannot be allocated on a stack, because sometimes a queue node supplied by a caller is read or written by other threads, even after the caller has released its lock on the mutex. These approaches require the queue nodes to be allocated on a heap, which is slower than stack allocation, and may require acquiring other locks on the heap itself. Further, these methods require that queue nodes never be freed for the lifetime of the mutex, or somehow be atomically reference-counted to determine when it is safe to free them (which is expensive in a multithreaded environment, compared to ordinary reads and writes). The approaches also require that a queue node live longer than the time between acquisition and release of the lock. Additionally, the Krieger et al. method sometimes allows readers to block other readers when a reader expects to be unblocked by its predecessor when the latter has already seen no successor to unblock, which causes the reader to block until all previous readers release the mutex.

Thus, there is a need for further advances in multithreaded programming techniques to overcome these and other disadvantages.

BRIEF DESCRIPTION OF THE DRAWINGS

The features and advantages of the present invention will become apparent from the following detailed description of the present invention in which.

DETAILED DESCRIPTION

An embodiment of the present invention is a reader-writer mutex process that enforces mutual exclusion of readers and writers, in a way that overcomes deficiencies in previous reader-writer mutexes. Processing threads acquire either "reader locks" or "writer locks" on a mutex before entering a critical section, and release their lock afterwards. The mutex's job is to ensure that if a writer is in the critical section, it is the only thread there. Typically, a reader-writer mutex serves to protect the consistency of a data structure. Threads wishing to modify the structure do so only after acquiring a writer lock. Threads wishing to read the structure acquire a reader lock. The advantage of a reader-writer mutex over a plain mutex is that multiple readers can proceed concurrently, and hence it is important that readers never block readers.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

A thread may have to wait for other threads to leave before it enters a critical section. The invention is fair because it services threads in "first come, first serve" order, which ensures that no thread gets stuck waiting forever. A waiting thread should not consume memory bandwidth; otherwise it will slow down other threads. Waiting is done by "local spinning", which means reading a cache line that no other processor will touch frequently, until another thread updates the cache line to say "proceed".

The RW mutex may be implemented by using a queue. The queue includes zero or more queue nodes that are created and destroyed as needed. The mutex comprises a single word that points to the tail of the queue. In embodiments of the present invention and as used herein, a "word" defines the amount of memory needed to store a pointer value in the processing system. Processing threads may put a request onto the queue when they require either read or write access to a critical section protected by the mutex. A request for access is represented by a queue node. Each thread provides the queue node on which it will spin. When a queue node is the head of the queue, the thread that created the queue node is granted access to the critical section. In embodiments of the present invention, the queue node is created on the stack of a thread. The RW mutex points to the tail of the queue to indicate where a next thread desiring access to the critical section may be linked.

Figure 1:
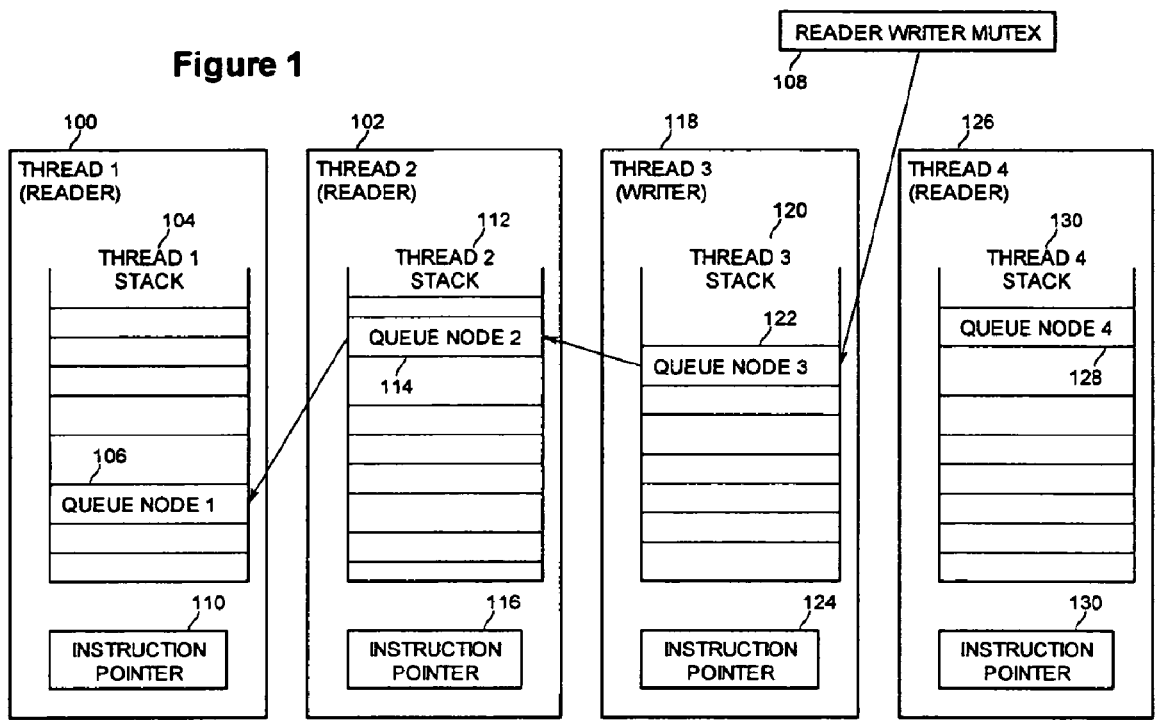
FIG. 1 is a diagram of an example queue for a reader writer mutex according to an embodiment of the present invention.

FIG. 1 is a diagram of an example queue for a reader writer mutex according to an embodiment of the present invention. FIG. 1 shows four threads at various stages. Thread 1 100 and thread 2 102 are readers who are inside the critical section. Thread 1 100 includes a stack 104. Thread 1 has previously created queue node 1 106 on its stack 104. This queue node 1 106 is currently the head of the queue for reader writer mutex 108. Thread 1 also includes instruction pointer 110 to specify the current instruction being executed by the thread. When thread 1 is in the critical section, the instruction pointer references memory within the critical section. Similarly, Thread 2 102 includes a stack 112. Thread 2 has previously created queue node 2 114 on its stack 112 and linked queue node 2 into the queue for the RW mutex. Thread 2 also includes instruction pointer 116 to specify the current instruction being executed by the thread. When thread 2 is in the critical section, the instruction pointer references memory within the critical section. Thread 3 118 is a writer who is waiting to enter the critical section after the two prior readers (i.e., threads 1 and 2) leave it. Thread 3 includes a stack 120 containing queue node 3 122, as well as instruction pointer 124. Thread 4 126 is a reader who is constructing queue node 4 128 on its stack 130 in preparation to adding it to the queue. After thread 4 adds queue node 4 128 to the queue, thread 4 will wait until the prior writer (thread 3) signals that it has left the critical section. Once queue node 4 128 is added to the queue, reader writer mutex 108 will be changed to point to queue node 4 128 as the new tail of the queue. Thread 4 also includes instruction pointer 130.

Figure 2:
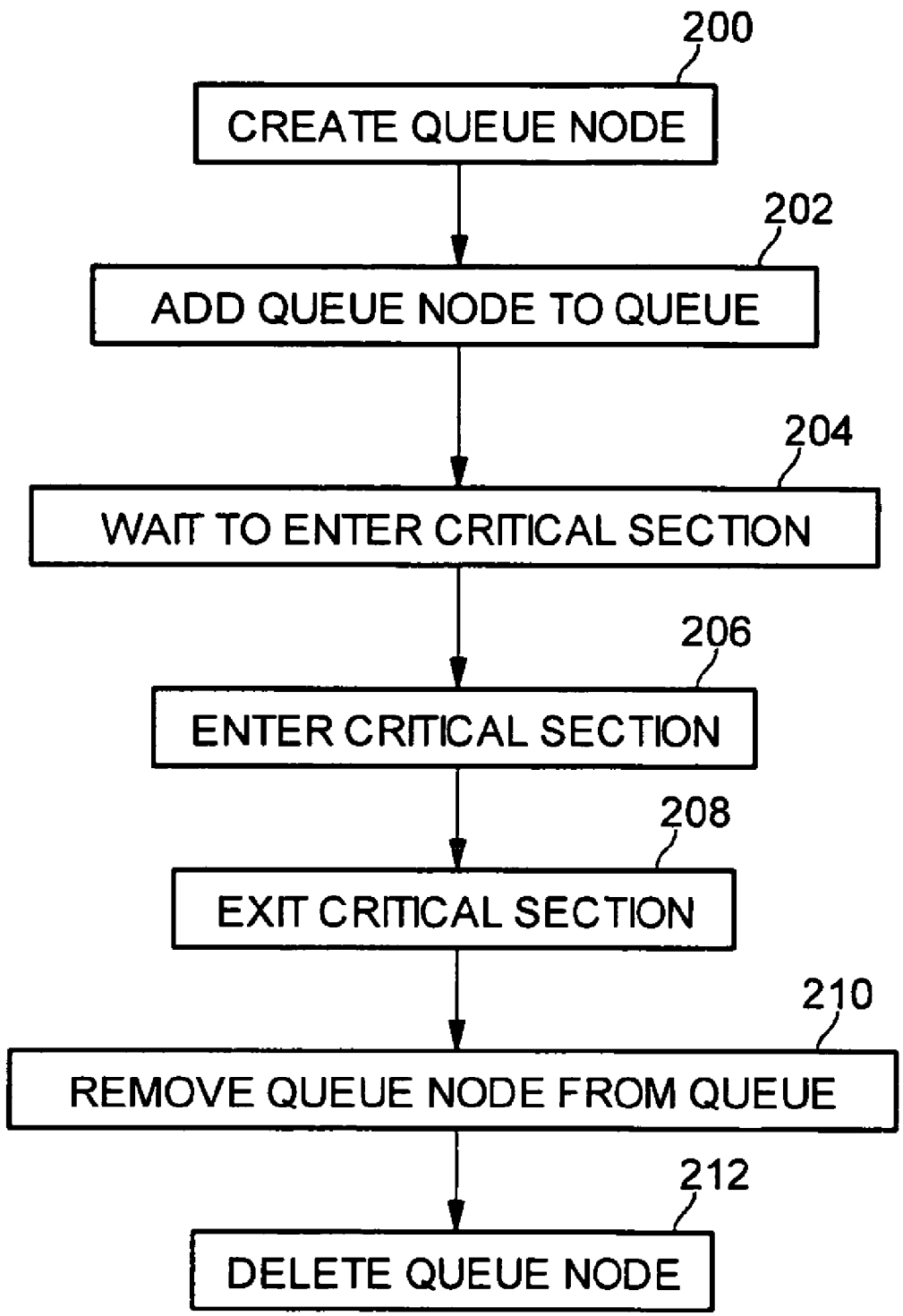
FIG. 2 is a diagram of a queue node according to an embodiment of the present invention.

FIG. 2 is a flow diagram of using a queue with a reader writer mutex according to an embodiment of the present invention. At block 200, a thread desiring access to a critical section creates a queue node on the stack of the thread. This is the step that thread 4 126 is at in the example of FIG. 1. At block 202, the thread adds the newly created queue node to the tail of the queue. At block 204, the thread waits to enter the critical section by spinning on its queue node. This is the step that thread 3 118 is at in the example of FIG. 1. At block 206, when a thread acquires the lock, the thread is allowed to enter the critical section. This is the step that thread 1 100 and thread 2 102 are at in the example of FIG. 1. At block 208, the thread exits the critical section. At block 210, the thread removes the queue node from the queue. Finally, at block 212, the thread deletes the queue node from the thread's stack.

Figure 3:
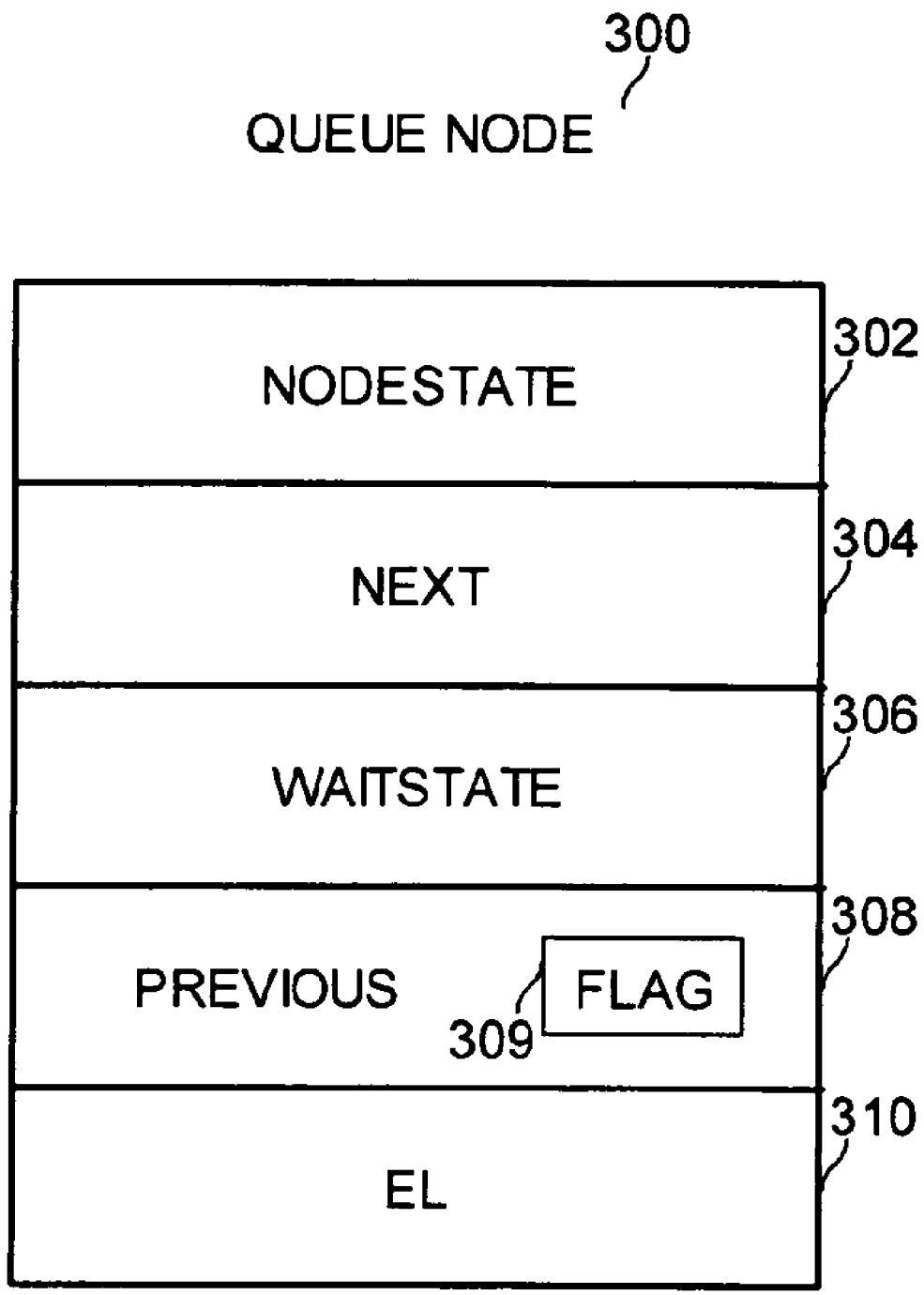
FIG. 3 is a flow diagram of using a queue with a reader writer mutex according to an embodiment of the present invention.

FIG. 3 is a diagram of the detailed structure of a queue node 300 according to an embodiment of the present invention. A queue node comprises a data structure representing a request to acquire the mutex and access a critical section and includes at least five fields. The NodeState field 302 specifies information about or to the owning thread. According to embodiments of the present invention, the value may be Writer, Reader, UnblockNext, or ActiveReader. The Writer state indicates that the thread plans to write data in the critical section. The Reader state indicates that the thread plans to read data in the critical section. According to embodiments of the present invention, the UnblockNext state lets a successor thread signal that it has only partially linked in its own queue node, and therefore the current thread should wait until the successor queue node is fully linked. The ActiveReader state indicates that the thread is currently in the critical section and actively reading data. The Next field 304 is a pointer to the next queue node in the queue (towards the tail of the queue). The Next field points to a queue node that is stored in another thread's stack. The WaitState field 306 specifies the waiting status of the thread (whether a thread is to wait or proceed). According to embodiments of the present invention, the types may be Spin, Going, or Busy. The Spin state indicates that the thread is waiting. The Going state indicates that the thread can access the critical section. According to embodiments of the present invention, the Busy state indicates that the queue node cannot be deleted yet. This avoids premature destruction of a queue node before all threads are done accessing it. The Previous (Prev) field 308 is a pointer to the previous queue node in the queue (towards the head of the queue). According to embodiments of the present invention, Flag field 309 may comprise an otherwise unused bit of the Previous field (a low order bit, for example) as a flag bit to coordinate removal of a queue node from the queue. The EL field 310 comprises a simple spin mutex used to assist atomicity of deletion of readers from the middle of the queue.

Table I shows the internal structure of a ReaderWriterMutex and a QueueNode. To aid in comparison with the prior art, underscored text indicates code added by embodiments of the present invention and strikeout text indicates code removed by the present invention, relative to the code disclosed in the Krieger et al. reference. Stylistic and obvious modifications are not marked.

TABLE I

```
1 enum NodeState_t {
2       WRITER, READER, UNBLOCKNEXT, ACTIVEREADER
3 };
4 enum WaitState_t {
5       SPIN, GOING, BUSY
6 };
7 struct QueueNode {
8       QueueNode* Prev;
9       QueueNode* Next;
10      NodeState_t NodeState;
11      WaitState_t WaitState;
12      SpinLock EL;
13 };
14 struct ReaderWriterMutex {
15      QueueNode* Qtail;
16 };
```

Figure 4:
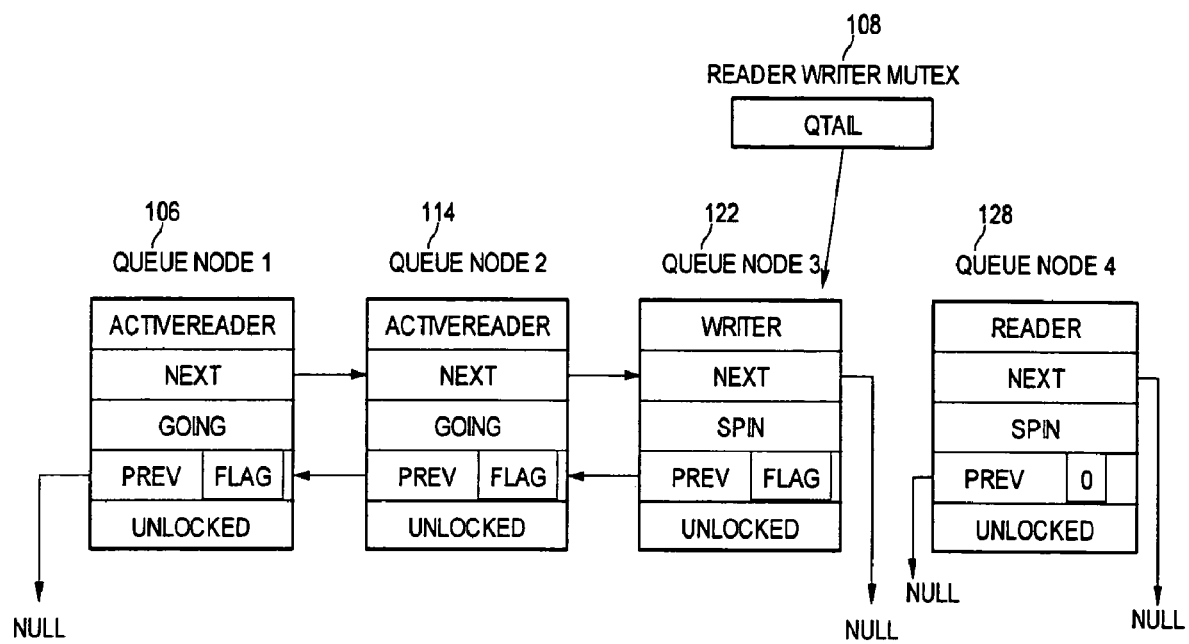
FIG. 4 is a diagram of the example queue of FIG. 1 detailing queue node values according to an embodiment of the present invention.

FIG. 4 is a diagram of the example queue of FIG. 1 detailing sample queue node values according to an embodiment of the present invention. The reader writer mutex structure 108 comprises a pointer to the queue tail (Qtail). Queue node 1 106 has a NodeState field value of ActiveReader and the WaitState field of queue node 1 is set to Going, because the thread that created queue node 1 has access to the critical region and is a reader. The Next field points to the next queue node in the queue (i.e., queue node 2 114). The Prey field points to null because this queue node is the head of the queue. The EL field of queue node 1 is Unlocked. Similarly, Queue node 2 114 has a NodeState field value of ActiveReader and the WaitState field of queue node 2 is set to Going, because the thread that created queue node 2 has access to the critical region and is a reader. The Next field points to the next queue node in the queue (i.e., queue node 3 122). The Prey field points to queue node 1 because that queue node is ahead of queue node 2 in the queue. The EL field of queue node 2 is Unlocked.

For queue node 3 122, the NodeState field value is Writer. The Next field points to null because queue node 3 is the current tail of the queue. The WaitState field is set to Spin, because queue node 3 is waiting for its turn to access the critical section. The Prey field points to the previous queue node in the queue (i.e., queue node 2 114). The EL field of queue node 3 is Unlocked.

For queue node 4 128, the NodeState field value is Reader. The Next and Prey fields point to null because the queue node is newly created and not yet linked into the queue. The WaitState field is set to Spin, because queue node 4 is waiting for its turn to access the critical section. The Flag is set to zero. The EL field of queue node 4 is Unlocked.

Table II shows a typical calling sequence for a reader in a processing thread. Similar procedures calls may be used for a writer. In embodiments of the present invention, the calling thread can allocate its queue node on its stack. The techniques disclosed in the Krieger et al., and Mellor-Crummey references do not permit this for readers.

TABLE II

```
1 ReaderWriterMutex m;
2 {
3       QueueNode n;          // create queue node on stack
4       AcquireForRead (&m, &n);
5       ..... // no thread has writer lock on mutex here.... //
6       ReleaseForRead (&m, &n);
7 }
```

Tables III through VII describe additional operations of embodiments of the present invention. Table III defines the atomic operations required by embodiments of the present invention. These atomic operations are FetchAndStore, CompareAndSwap, and FetchAndAdd. These operations exist on most modern computing hardware, notably processors commercially available from Intel Corporation, such as the 32-bit processor architecture known as IA-32, and the 64-bit architecture known as Itanium Processor Family (IPF). In Table III, "T" indicates the type of the memory location being atomically updated, and "*" indicates a type pointer.

TABLE III

```
1 T FetchAndStore (T* location, T value){
2       T result;
3       Atomic {
4             result = *location;
5             *location = value;
6       }
7       Return result;
8 }
9
10 T CompareAndSwap (T* location, T value, T comparand){
11      T result;
12      Atomic {
13            result = *location;
14            If (result == comparand)
15                  *location = value;
16      }
17      Return result;
18 }
19
20 T FetchAndAdd (T* location, T value){
21      T result;
22      Atomic {
23            result = *location;
24            *location = result + value;
25      }
26      Return result;
27 }
```

Tables IV and V show how a "writer lock" is acquired and released. These procedures are similar to methods disclosed in the Krieger et al. reference, and are provided herein to aid in understanding how they interact with the techniques of embodiments of the present invention. The notation &x indicates construction of a pointer that points to location x. When a thread attempts to acquire a write lock on the mutex (Table IV), the thread enqueues its queue node on the queue, and if it is not the only node in the queue, waits for its predecessor to set its WaitState to Going. When the thread releases the lock (Table V) and there is a successor queue node, the thread signals the next thread to go by changing the latter's WaitState to Going.

TABLE IV

```
1 Procedure AcquireForWrite (ReaderWriterMutex* m, QueueNode*
  node){
2       node->Prev = NULL;
3       node->Next = NULL;
4       node->WaitState = SPIN;
```

TABLE IV-continued

```
5       node->NodeState = WRITER;
6
7       QueueNode* pred = FetchAndStore (&m.Qtail, node);
8       If pred != NULL then
9           pred->Next = Node;
10          Wait until node->WaitState == GOING
11  }
```

TABLE V

```
Procedure ReleaseForWrite (ReaderWriterMutex* m, QueueNode*
node) {
    If node->Next == NULL then
        If node == CompareAndSwap (m->Qtail, NULL,
        node) then
            Goto Done;
        Wait until node->Next != NULL;
    node->Next->Prev = NULL;
    node->Next->WaitState = GOING;
    Done:;
}
```

Table VI shows how a reader lock is acquired. The thread enqueues it's queue node in the queue using a FetchAndStore procedure call. If the thread has a predecessor (which was the old queue node at the tail of the queue), it atomically checks if the predecessor has a NodeState of READER, and if so, advances the NodeState field to a state of UnblockNext. If the predecessor is not an ActiveReader, the thread spins on its own queue node's WaitState field until it is set to Going by the preceding thread. Then the thread tries to atomically transition its NodeState from Reader to ActiveReader. If this fails, the thread indicates that it has a successor that needs to be unblocked. To unblock its successor, the thread waits until the successor queue node is linked into the queue (by waiting for "node->Next !=NULL"), sets the successor queue node's WaitState to Going, and then the current thread becomes an ActiveReader.

TABLE VI

```
© 2005 Intel Corporation
1   Procedure AcquireForRead (ReaderWriterMutex* m, QueueNode*
    node) {
2       node->Prev = NULL;
3       node->Next = NULL;
4       node->WaitState = SPIN;
5       node->NodeState = READER;
6       // pred is a pointer to a queue node in the queue
7       QueueNode* pred = FetchAndStore (&m.Qtail, node);
8       If pred != NULL then
9           node->Prev = pred;
10
11          // Problem: Once Pred->Next becomes non-null, its owner
12          // may proceed to destroy *pred.
13          // Improvement: Read Pred->NodeState before writing to
14          // Pred->Next, because once Pred->Next becomes non-
            null,
15          // the owner of the pred node may destroy it.
16          NodeState_t predstate = CompareAndSwap(
17              &pred->NodeState, UNBLOCKNEXT,
18              READER);
19          // Problem: Our predecessor might be a reader that executes
20          // lines 33-34 below before we have a chance to set
            Pred->Next,
21          // in which case we regrettably spin until all predecessors
            release
22          // the lock (the last such predecessor executes line 53 of
            Table VII).
23          // Improvement: The CompareAndSwap above atomically
            updates
```

TABLE VI-continued

```
24          // Pred->NodeState to UNBLOCKNEXT if it was a
            READER, which
25          // tells the predecessor to wait for us to set "next"
26          Pred->Next = node;
27          If (predstate != ACTIVEREADER)
28              Wait until node->WaitState == GOING;
29      // Improvement: The CompareAndSwap fails if our successor
        has
30      // changed us to UNBLOCKNEXT, which signals us that we
        should wait
31      // until the successor links itself in, and then signal the
        successor to get
32      // going.
33
35
36      NodeState_t oldstate = CompareAndSwap (&node->NodeState,
36                                             ACTIVEREADER, READER);
37      If oldstate != READER then
38          Wait until node->Next != NULL;
39          node->NodeState = ACTIVEREADER;
40          node->Next->WaitState = GOING;
41      // this solves the readers block readers problem
41  }
```

Table VII shows how a reader lock is released. The method depends on having an unused bit FLAG in the "Prey" pointer field (e.g., if the queue nodes are 16-bit aligned, then the least significant bit of the pointer can be used for FLAG.) The FLAG bit is used to coordinate situations where two threads are trying to remove adjacent nodes in the queue. The thread uses a procedure call to FetchAndAdd to atomically fetch "Prey" and simultaneously mark it as "in use" by setting the FLAG bit. (Logically, it is a "FetchAndOr", but Intel processors support only FetchAndAdd, and in this case the two operations are identical because the FLAG bit is always zero before the FetchAndAdd).

TABLE VII

```
© 2005 Intel Corporation
1   Procedure ReleaseForRead (ReaderWriterMutex* m, QueueNode*
    node) {
2   Retry:
3       // Problem: Node pred might be destroyed after we read
        "node->Prev",
4       // causing the subsequent lock/unlock operations on the
        predecessor
5       // to be accessing/modifying freed memory.
6       // Improvement: Instead of reading "node->Prev", we
        automatically fetch
7       // it and mark it as in use by us.
8       QueueNode* pred = FetchAndAdd (&node->Prev, FLAG);
9       If pred != NULL Then
10          // Problem: lock/unlock retry loop is inefficient because of
            the
11          // iterated lock/unlock behavior.
12
13
14
15          // Improvement: the FLAG bit stops the predecessor from
16          // prematurely finishing, indeed the predecessor waits for
            us
17          // to release its lock on pred->EL.
18          Try to acquire lock on pred->EL
19          If could not acquire the lock then
20              // Wait for predecessor to unlink itself
21              Wait until node->Prev != pred + FLAG;
22              // Now predecessor is waiting for us to release it
23              Release lock on pred->EL;
24              Goto Retry;
25          node->Prev = pred;
26          Acquire lock on node->EL;
27          pred->Next = NULL;
```

TABLE VII-continued

| | |
|---|---|
| 28 | If node->Next == NULL and |
| 29 | node != CompareAndSwap (m->Qtail, pred, node) then |
| 30 | wait until node->Next != NULL; |
| 31 | tmp = NULL; |
| 32 | if node->Next != NULL then |
| 33 | tmp = FetchAndStore (&(node->Next->Prev), pred) |
| 34 | pred->Next = node->Next; |
| 35 | release lock on pred->EL; |
| 36 | else |
| 37 | acquire lock on node->EL; |
| 38 | if node->Next == NULL then |
| 39 | if node == CompareAndSwap (m->Qtail, NULL, node) then |
| 40 | goto Unlock_Self; |
| 41 | else |
| 42 | wait until node->Next != NULL; |
| 43 | // Problem: setting WaitState to GOING may cause the owner of |
| 44 | // the next node to destroy it, causing our write to |
| 45 | // node->Next-Prev to write it into freed memory |
| 46 | |
| 47 | |
| 48 | // Improvement: temporarily mark WaitState as in use, and set it to |
| 49 | // GOING after reading Next->Prev. Use fetch-and-store here so |
| 50 | // that we know if the previous value had its FLAG bit set. |
| 51 | node->Next->WaitState = BUSY; |
| 52 | tmp =FetchAndStore (&node->Next->Prev, NULL); |
| 53 | node->Next->WaitState = GOING; |
| 54 | |
| 55 | Unlock_Self: |
| 56 | // Improvement: Detect if our successor is unlinking itself, and if so, wait |
| 57 | // for it to release our spin lock on Node->EL. |
| 58 | If tmp does not have its FLAG bit set then |
| 59 | Release lock on node->EL; |
| 60 | Else |
| 61 | Wait until lock on node->EL is released by our successor; |
| 62 | // Problem: exiting too soon might cause us to destroy our node while |
| 63 | // other threads are accessing it. |
| 64 | // Improvement: wait until we know that our data are not in use by our |
| 65 | // predecessor. |
| 66 | Wait until node->WaitState != BUSY; |
| 67 | } |

If there is a predecessor, then the thread tries to acquire a spin lock on the predecessor. If it cannot, that means that the owner of the predecessor is trying to remove the predecessor from the queue, and the current thread should wait until that removal is done, and retry with the new predecessor. Interestingly, it detects that the removal is done by spinning until "node->Prev!=pred+FLAG", and then releases the lock on Pred->EL that the predecessor thread acquired. The present protocol is unusual because a thread releases a lock acquired by another thread. Otherwise, having successfully acquired a spin lock on the predecessor, the thread acquires a spin lock on its own queue node and removes it from the queue, taking care to update the queue tail pointer ("m->Qtail"), if necessary. It then releases the spin lock on the predecessor and goes to the "Unlock_Self" label.

If the result of the FetchAndAdd procedure call indicates that there is not a predecessor, the thread acquires a spin lock on its own queue node. If the thread has no successor, then the thread attempts to change the queue to empty using "CompareAndSwap (m->Qtail, NULL, node"). If successful, processing continues at the "Unlock_Self" label. If not, that means that another thread is busy appending a successor queue node to the queue, and so the thread waits until "node->Next !=NULL". The thread then signals the next thread that it can proceed. The signaling has to be done carefully, because either setting a Prey field to NULL or setting WaitState to Going may cause the owning thread to proceed, possibly to the point where the thread destroys the corresponding queue node before the current thread is done with it. To circumvent this problem, the current thread temporarily sets the successor's WaitState to Busy before setting the successor's Prey pointer to NULL and setting WaitState to Going. Note too that this process uses FetchAndStore to set the successor's Prey field, which is essential to the last "Unlock_Self" step.

The "Unlock_Self" step in Table VII completes the protocol. Here, variable tmp is the value of "node->Next->Prev" before the current node was unlinked. If the FLAG bit of tmp is not set, the current thread releases the spin lock the current thread acquired on its queue node. But if the FLAG bit is set, this indicates that the owner of the successor queue node is in the retry loop, and the current thread must wait for the successor thread to release the lock on the queue node that the current thread acquired. Finally, the thread waits until node->WaitState !=Busy, after which the thread knows that it is safe to return (and destroy the node).

Figure 5:
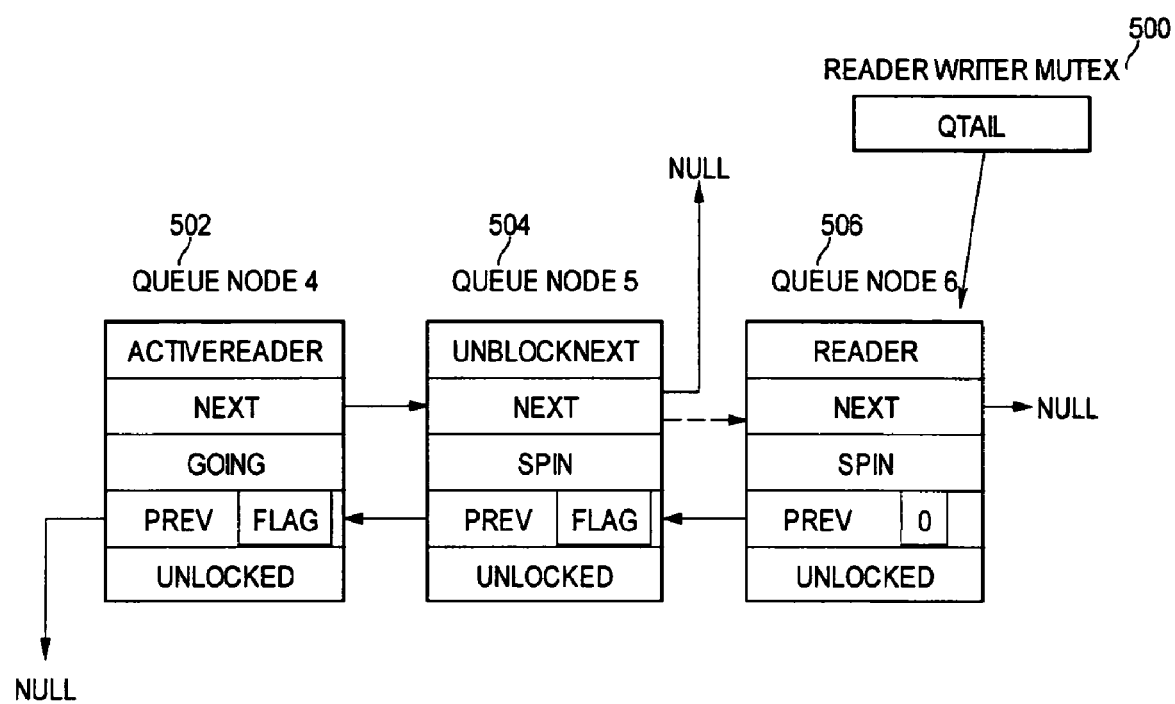
FIG. 5 is a diagram illustrating the use of a queue node state value UnblockNext according to an embodiment of the present invention.

FIG. 5 is a diagram illustrating the use of a NodeState value UnblockNext according to an embodiment of the present invention. In this example, there are three threads that participate each with a queue node on its stack. The thread owning queue node 4 502 has already entered the critical section as a reader. Two other threads have recently added their queue nodes (queue node 5 504 and queue node 6 506) to the queue pointed to by reader writer mutex 500. The owner of queue node 5 attempted to change its NodeState from Reader to ActiveReader. However, in the meantime, before that attempt, the owner of queue node 6 506 changed that NodeState (of queue node 5) from Reader to UnblockNext, so as to notify the owner of queue node 5 that it has a successor, and should wait until its Next field becomes non-null (i.e., is set as shown by the dashed arrow). The notifications are all done without any internal locking.

Embodiments of the present invention have at least three advantages over prior reader-writer mutexes that spin on local memory. First, it allows the queue nodes to be allocated on the caller's stack. Previous reader-writer mutexes (such as Kreiger et al. and Mellor-Crummey et al.) do not allow the queue nodes to be stack-allocated, because sometimes a queue node supplied by a caller is read or written by other threads, even after the caller has released its lock on the mutex. The known prior art requires that the queue nodes be heap-allocated, which is generally slower than stack allocation, and indeed may require acquiring other locks on the heap itself. Furthermore, the known prior art requires that the queue nodes never be freed for the lifetime of the mutex, or somehow be atomically reference-counted to determine when it is safe to free them. Atomic reference counting itself is relatively expensive in a multithreaded environment, compared to ordinary reads and writes. Embodiments of the present invention guarantee that a thread will not exit the mutex-release procedure until other threads no longer access its queue node; thus a thread can allocate its queue nodes on its own stack.

Second, embodiments of the present invention never allow readers to block other readers, as Krieger, et al., sometimes does when a reader expects to be unblocked by its predecessor when the latter has already seen no successor to unblock, which causes the reader to block until all previous readers release the mutex.

Third, embodiments of the present invention use only a single word for the mutex, whereas Mellor-Crummey, et al., requires three words, which makes this prior art design much more costly in applications that have fine-grained locking.

The reason is that typically in fine-grained situations, there needs to be a mutex per data element, but only a lock (or a few locks) held by a thread. So it pays to keep the mutex object small at the cost of perhaps making the lock object bigger.

Another advantage is that embodiments of the present invention fit well with the C++ "resource acquisition is initialization" idiom that is widely used for writing exception-safe code. In this idiom as applied to mutexes, an object is constructed that represents acquisition of a lock, and destruction of the object releases the lock. If an exception is thrown in the critical section, the object is implicitly destroyed, thus automatically releasing the lock. This applies to embodiments of the present invention because the object can be (or contain as a member) the queue node itself. Neither the Kreiger et al., nor the Mellor-Crummey et al., prior art references permit this economy because they require that the queue node live longer than the time between acquisition and release of the lock.

Embodiments of the present invention enable stack-allocation of queue nodes, by having a protocol that never references a queue node that might already be destroyed by another thread. This arises from the use of several techniques. First, use atomic operations and a mark bit in the Prey pointer so that the owner of a node can handshake with the owner of the previous node. Using atomic operations and a mark bit has been used before for lockless algorithms for removing an item from a linked list (such as in Timothy Harris, "A Pragmatic Implementation of Non-Blocking Linked-Lists," Proc. Of 2001 IEEE Symposium on Distributed Computing"), but in embodiments of the present invention atomic operations and the mark bit are used not only to handshake removal, but also to control which thread releases a lock. Furthermore, in the prior lockless algorithms, links in the item may be used by other threads even after it is removed from the list, and thus complicated algorithms (e.g. Harris' "timer snapshots") are required to determine when the item can be destroyed. Second, a thread releases a lock held by another thread. Third, an extra WaitState Busy is added that signals to the owner of a queue node that it should not yet destroy the node. Fourth, judicious ordering of reads and writes is used.

Furthermore, embodiments of the present invention manage to use only a single word for the mutex portion, and yet never cause readers to block readers. Krieger, et al. has the single-word feature, but has the reader blocks readers problem. Mellor-Crummey does not have the reader blocks readers problem, but requires three words for the mutex.

Although the operations detailed herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like, as long as they have shared memory and support the atomic operations described in Table III. The invention can also be practice in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A computer-implemented method of implementing fair scalable reader writer mutual exclusion for access to a critical section of a memory coupled to a processor comprising:

creating a first queue node for a first thread of a plurality of processing threads executing on the processor, wherein the first queue node is created in a first region of the memory allocated for a stack of the first thread, the first queue node representing a request by the first thread to access the critical section;

adding the first queue node to a queue pointed to by a single word reader writer mutex for the critical section by setting pointers within the queue to point to the first queue node, the queue representing a list of threads desiring access to the critical section, each queue node in the queue being in a region of the memory allocated for a stack of a thread of the plurality of processing threads, the first queue node being added to a tail of the queue;

waiting until a condition is met, the condition being that the first queue node has no preceding write requests as indicated by predecessor queue nodes on the queue;

entering the critical section by the first thread when the condition is met;

releasing a spin lock by the first thread, the spin lock acquired by a second thread of the plurality of processing threads; and exiting the critical section by the first thread.

2. The method of claim 1, wherein a thread that is a reader never blocks another thread that is a reader.

3. The method of claim 1, wherein the first thread prevents an attempt to reference a second queue node by the first thread when the second queue node is already deleted by a third thread of the plurality of processing threads.

4. The method of claim 1, wherein after a reader thread partially links a queue node into the queue while its predecessor thread is trying to acquire a lock on the reader writer mutex, the reader thread causes the predecessor thread to wait until the reader thread completes linking the queue node into the queue.

5. The method of claim 1, wherein each queue node comprises one of a plurality of wait states, and one of the wait states comprises a Busy state, indicating that a queue node cannot be deleted yet.

6. The method of claim 1, wherein each queue node comprises one of a plurality of node states, and notification of node states between threads is accomplished by atomic operations.

7. The method of claim 6, wherein one of the node states comprises an UnblockNext state, the UnblockNext state allowing a successor thread to signal that the successor thread has only partially linked the successor thread's queue node.

8. An article comprising: a machine accessible non-transitory storage medium containing instructions, which when executed, result in implementing fair scalable reader writer mutual exclusion for access to a critical section of a memory coupled to a processor by a plurality of processing threads executing on the processor by
creating a first queue node for a first thread of the plurality of processing threads, wherein the first queue node is created in a first region of the memory allocated for a stack of the first thread, the first queue node representing a request by the first thread to access the critical section;
adding the first queue node to a queue pointed to by a single word reader writer mutex for the critical section by setting pointers within the queue to point to the first queue node, the queue representing a list of threads desiring access to the critical section, each queue node in the queue being in a region of the memory of the processing system allocated for a stack of a thread of the plurality of processing threads, the first queue node being added to a tail of the queue;
waiting until a condition is met, the condition being that the first queue node has no preceding write requests as indicated by predecessor queue nodes on the queue;
entering the critical section by the first thread when the condition is met;
releasing a spin lock by the first thread, the spin lock acquired by a second thread of the plurality of processing threads; and
exiting the critical section by the first thread.

9. The article of claim 8, wherein a thread that is a reader never blocks another thread that is a reader.

10. The article of claim 8, wherein the first thread prevents an attempt to reference a second queue node by the first thread when the second queue node is already deleted by a third thread of the plurality of processing threads.

11. The article of claim 8, wherein after a reader thread partially links a queue node into the queue while its predecessor thread is trying to acquire a lock on the reader writer mutex, the reader thread causes the predecessor thread to wait until the reader thread completes linking the queue node into the queue.

12. The article of claim 8, wherein each queue node comprises one of a plurality of wait states, and one of the wait states comprises a Busy state, indicating that a queue node cannot be deleted yet.

13. The article of claim 8, wherein each queue node comprises one of a plurality of node states, and notification of node states between threads is accomplished by atomic operations.

14. The article of claim 13, wherein one of the node states comprises an UnblockNext state, the UnblockNext state allowing a successor thread to signal that the successor thread has only partially linked the successor thread's queue node.

15. A computer system comprising:
a processor to execute a plurality of processing threads, each thread having a respective stack; and
a memory coupled to the processor, the memory to store a single word reader writer mutex to point to a queue representing a list of threads desiring access to a critical section of the memory;
wherein the processor is further configured to: create a first queue node in a first region of the memory allocated for a stack of the first thread, the first queue node representing a request by the first thread to access the critical section; add the first queue node to the queue by setting pointers within the queue to point to the first queue node, each queue node in the queue being in a region of the memory allocated for a stack of a thread of the plurality of processing threads, the first queue node being added to a tail of the queue; wait until a condition is met, the condition being that the first queue node has no preceding write requests as indicated by predecessor queue nodes on the queue; cause the first thread to enter the critical section when the condition is met; cause the first thread to release a spin lock acquired by a second thread of the plurality of processing threads; and cause the first thread to exit the critical section.

16. The system of claim 15, wherein the processor is further configured such that a thread that is a reader never blocks another thread that is a reader.

17. The system of claim 15, wherein the processor is further configured to prevent an attempt to reference a second queue node by the first thread when the second queue node is already deleted by a third thread of the plurality of processing threads.

18. The system of claim 15, wherein the processor is further configured such that after a reader thread partially links a queue node into the queue while its predecessor thread is trying to acquire a lock on the reader writer mutex, the reader thread causes the predecessor thread to wait until the reader thread completes linking the queue node into the queue.

19. The system of claim 15, wherein the processor is further configured such that each queue node comprises one of a plurality of wait states, and one of the wait states comprises a Busy state, indicating that a queue node cannot be deleted yet.

20. The system of claim 15, wherein the processor is further configured such that each queue node comprises one of a plurality of node states, and notification of node states between threads is accomplished by atomic operations.

21. The system of claim 20, wherein the processor is further configured such that one of the node states comprises an UnblockNext state, the UnblockNext state allowing a successor thread to signal that the successor thread has only partially linked the successor thread's queue node.

* * * * *